United States Patent
Hessmert et al.

(10) Patent No.: US 6,585,070 B1
(45) Date of Patent: Jul. 1, 2003

(54) METHOD AND SYSTEM FOR CONTROLLING THE HANDLING OF A VEHICLE IN RESPONSE TO A MOVEMENT

(75) Inventors: Ulrich Hessmert, Schwieberdingen (DE); Jost Brachert, Ditzingen (DE); Thomas Sauter, Remseck (DE); Helmut Wandel, Markgroeningen (DE); Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/693,742

(22) Filed: Oct. 20, 2000

(30) Foreign Application Priority Data

Oct. 20, 1999 (DE) .......................................... 199 50 477

(51) Int. Cl.⁷ ............................................. B60C 23/00
(52) U.S. Cl. ........................... 180/197; 701/83; 701/71; 701/74; 701/78; 303/139; 477/95
(58) Field of Search ................................ 180/197, 244; 701/70, 82, 83, 71, 74, 78; 303/139, 153, 166, 167; 73/146; 477/40, 92, 94, 95, 182

(56) References Cited

U.S. PATENT DOCUMENTS

| | | | | |
|---|---|---|---|---|
| 5,267,166 A | * | 11/1993 | Takata et al. | 303/182 |
| 5,895,854 A | * | 4/1999 | Becherer et al. | 152/450 |
| 5,913,240 A | * | 6/1999 | Drahne et al. | 73/146 |
| 6,293,140 B1 | * | 9/2001 | Lohberg | 73/146 |
| 6,321,154 B1 | * | 11/2001 | Schmitt et al. | 180/197 |

FOREIGN PATENT DOCUMENTS

| | | | |
|---|---|---|---|
| DE | 3942573 A1 | * | 6/1991 |
| DE | 196 20 581 | | 11/1997 |

\* cited by examiner

*Primary Examiner*—F. Zeender
(74) *Attorney, Agent, or Firm*—Kenyon & Kenyon

(57) ABSTRACT

A movement of a vehicle is detected, using tire sensors, by evaluating detected, measured signals in an evaluating unit in such a manner, that the polarity of the measured signals, starting from the measured signals at vehicle standstill, is used as an indicator of the vehicle moving direction.

3 Claims, 3 Drawing Sheets

METHOD AND SYSTEM FOR CONTROLLING THE HANDLING OF A VEHICLE IN RESPONSE TO A MOVEMENT

FIELD OF THE INVENTION

The present invention relates to a method and a corresponding system for controlling the handling of a vehicle in response to a movement.

BACKGROUND INFORMATION

When using a controlling system such as a traction control system for the usual start-up from rest on an incline, it is necessary, on the one hand, to prevent the vehicle from rolling backwards at the start of control, and on the other hand, to detect an occurrence of starting from rest in a timely manner. In the case of rolling backwards or rolling away, the vehicle should be held in position by building up a braking pressure, while in the case of starting from rest, the braking pressure with which the vehicle is held on the incline should be purposefully reduced, until a sufficiently large driving torque is available for starting up.

A device for ascertaining the rotational performance of a vehicle wheel is described in German Published Application No. 196 20 581, uniformly arranged, magnetizing surfaces of alternating polarity being provided in the circumferential direction of the wheel. The surfaces are incorporated into the tire wall or applied to the tire wall. A measuring sensor has two or more measuring elements disposed at different radial distances from the rotational axis, so that the phase angle between the measured signals emitted by the measuring elements changes in response to the tire deforming, because of forces acting upon a tire, or as a result of the transmitted driving or braking torques. The change in the phase angle can then be evaluated as a measure of the moments transmitted from the wheel or tire onto the roadway and/or a measure of the instantaneous coefficient of friction.

SUMMARY OF THE INVENTION

An object of the present invention is to specify a method and a system for accurately and reliably controlling the handling of a vehicle in response to starting from rest and/or rolling backwards on an incline.

In particular, the method and corresponding system of the present invention for controlling the handling of a vehicle in response to a movement can detect when the vehicle rolls away or backwards, and when it starts from rest. A slip controller can be acted upon in such a manner, that the vehicle can be prevented from rolling backwards by purposefully increasing the braking pressure, and that the vehicle can be comfortably started from rest by purposefully reducing the braking pressure. In response to starting from rest, the driving torque and the control pressure can also be correspondingly adjusted to the tire slip in such a manner, that the vehicle can always accelerate stably and comfortably.

Using a roll-away or backwards-roll detection made up of a tire sensor, a slip controller can stop a vehicle from rolling backwards by way of a high braking pressure. Such a function is possible for the first time, since a measured signal detected by a tire sensor can already react to low wheel speeds.

DETAILED DESCRIPTION

Figure 1:
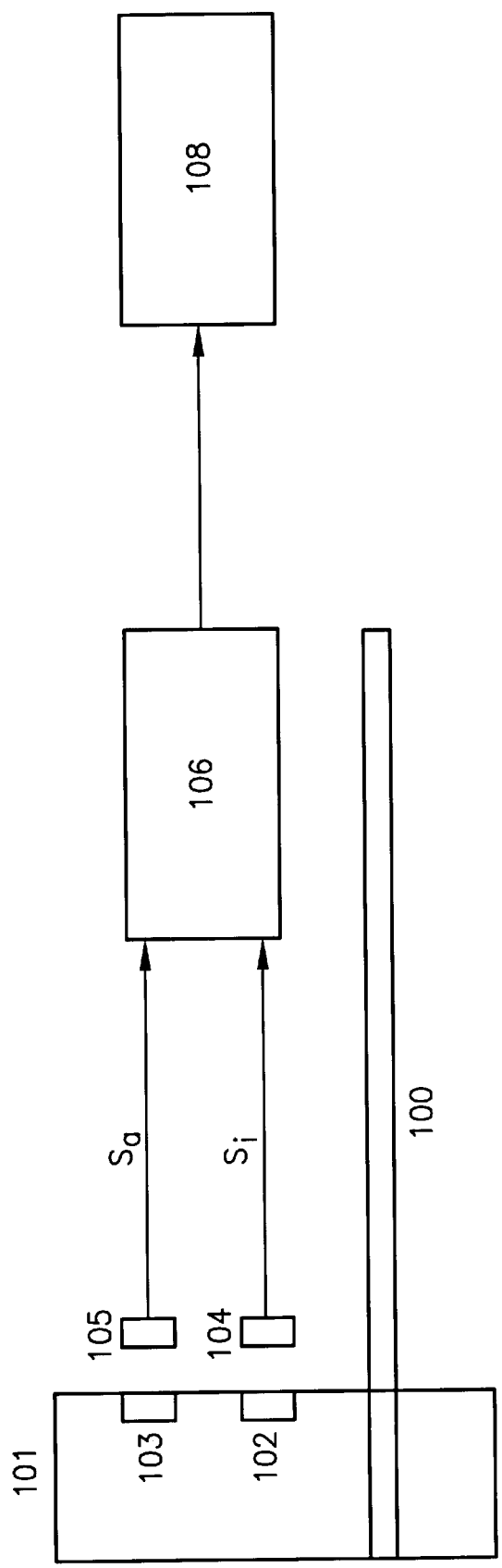
FIG. 1 shows a block diagram of a system for controlling the handling of a vehicle in response to a movement.

FIG. 1 shows a block diagram of a system of the present invention for controlling the handling of a vehicle in response to a movement, and especially in response to rolling away and/or starting from rest on an incline. As can be seen in FIG. 1, magnetizing surfaces (strips) 102,103 advantageously having flux lines running in the circumferential direction are provided at a tire 101, which represents all tires on the vehicle. Magnetizing surfaces 102,103 can be integrated into tire 101, or can be provided at the exterior of tire 101. The magnetization is sectional and always in the same direction, but it is inversely oriented, i.e. it has an alternating polarity. In FIG. 1, the magnetizing surface having positive polarity is designated by 102, and the magnetizing surface having negative polarity is designated by 103. Magnetized strips 102 and 103 preferably run near the rim flange and the contact area of the tire. Therefore, detecting elements 102 and 103 rotate at the speed of the wheel.

Figure 2A:
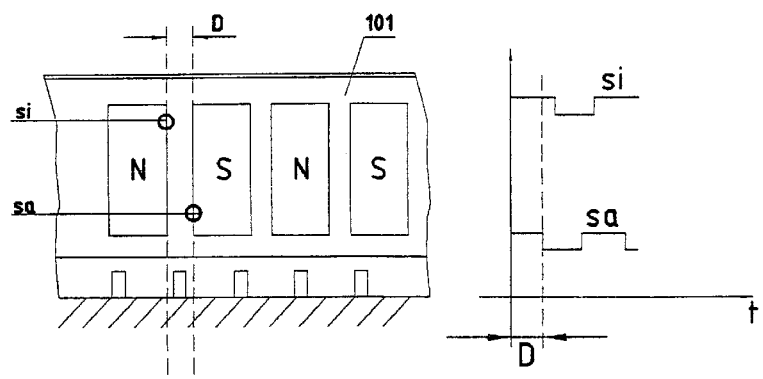
FIG. 2a is a first symbolic representation of a tire-wall section, and the output signal of a pickup in the unloaded condition, in the loaded condition during a forwards movement, and in the loaded condition during a backwards movement, respectively.

Pickups 104 and 105 are permanently attached to the body at two or more different locations in the direction of rotation, and are also at different radial distances from rotational axis or wheel axle 100. This produces an inner signal si, which pickup 104 detects near the wheel hub, and an outer signal sa, which pickup 105 further away from the wheel hub detects. Measured signals si and sa are out of phase with respect to each other by a phase angle D, as is shown in FIG. 2a for a vehicle standing still.

Figure 2B:
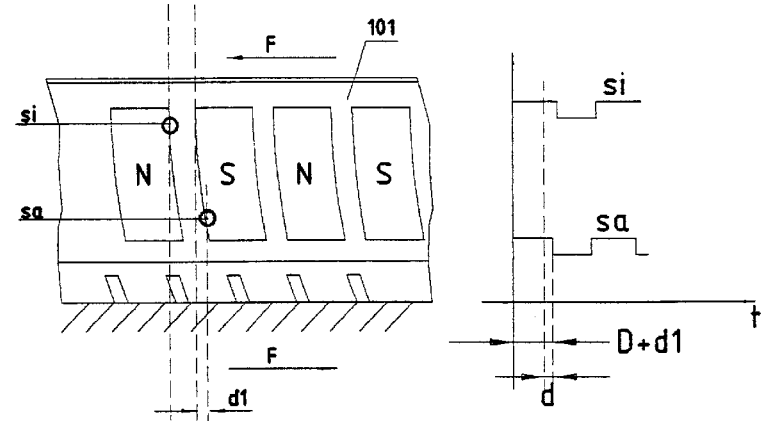
FIG. 2b is a second symbolic representation of the tire-wall section, and the output signal of the pickup in the unloaded condition, in the loaded condition during the forwards movement, and in the loaded condition during the backwards movement, respectively.
Figure 2C:
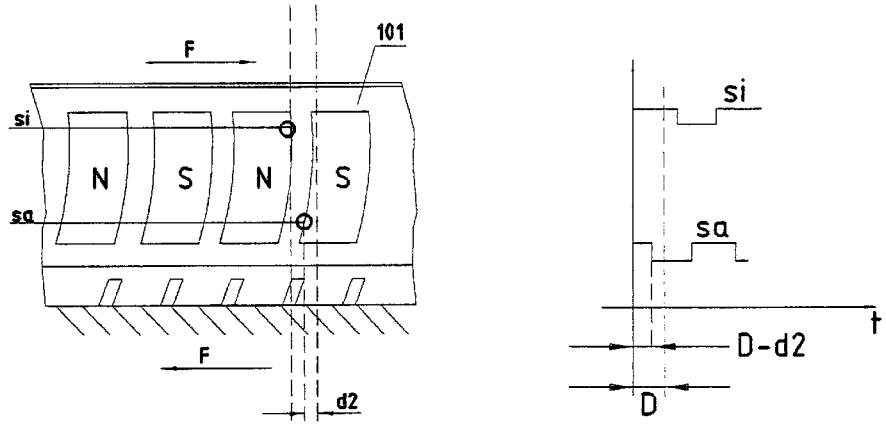
FIG. 2c is a third symbolic representation of the tire-wall section, and the output signal of the pickup in the unloaded condition, in the loaded condition during the forwards movement, and in the loaded condition during the backwards movement, respectively.

In response to tire 101 deforming due to forces acting on it, such as while driving or braking, phase angle D between inner signal si and outer signal sa is shifted. The shift ranges between D and (D+d1) in the positive rotational direction, and between D and (D−d2) in the negative rotational direction, as shown in FIGS. 2b and 2c, respectively. The larger the deformation of the tire, the larger the moment that can be transmitted to the roadway. As soon as shift d1 or d2 becomes smaller, the transmittable moment can no longer be increased, since either the coefficient of friction is then too small or the driving torque is too large. This is particularly significant in the later-described control of an occurrence of starting from rest.

A rotation of tire 101 is advantageously detected in the circumferential direction by way of the changing polarity of measured signals si and sa. Detected measured signals si and sa, along with their respective amplitudes and phases, are supplied to an evaluation unit 106 shown in FIG. 1 for ascertaining velocity signals and phase angles. The evaluation unit calculates respective velocity signals vi and va in accordance with the configuration of pickups 104,105, also referred to as tire sensors, using the known inner and outer circumferences of tire 101, respectively. The velocity signals can then be used as input signals for a drive/braking control system.

Evaluation unit 106 also detects a change by d1 or d2 of the phase angle between inner signal si and outer signal sa, the change indicating a deformation of tire 101 in response to driving or braking. To represent this change in the phase angle of measured signals si and sa, reference is made once more to FIGS. 2*b* and 2*c*, in which FIG. 2*b* shows a forwards movement of the vehicle, and FIG. 2*c* shows a backwards movement of the vehicle.

A backwards roll of the vehicle is easily recognized from the opposite directions of a slipping wheel (D+d1) and a non-slipping wheel (D−d2).

Figure 3A:
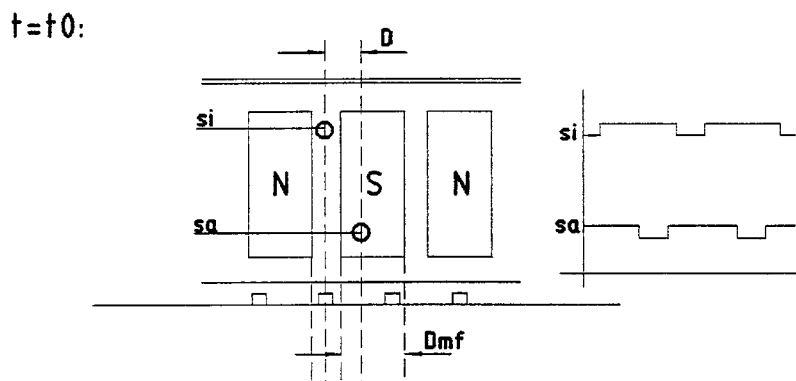
FIG. 3a is a first view for explaining the method according to the present invention.

As will be explained by referring to FIG. 3, an opposite rotational direction can also be detected without wheel deformation. Using FIG. 3, the conditions for a functioning detection of the rotational direction are explained. In FIG. 3*a*, a width of the magnetizing surface of measured-value transmitters 102 and 103 is designated by Dmf and the width of the corresponding gap between two magnetized surfaces is denoted by Dsp. To successfully use the system for the method of the present invention, width Dfm of the magnetized surface should be much larger than distance D between measured signals si and sa, and gap width Dsp should approximately be just as large as distance D between measured signals si and sa.

Figure 3B:
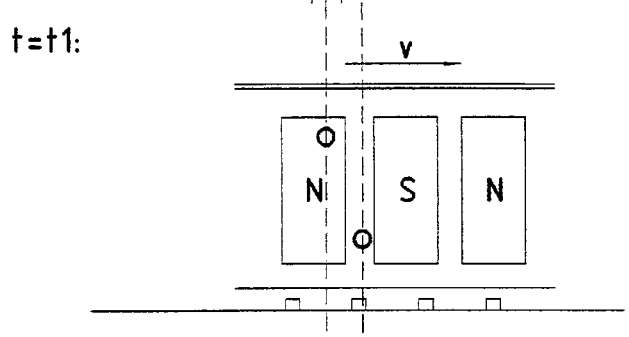
FIG. 3b is a second view for explaining the method according to the present invention.
Figure 3C:
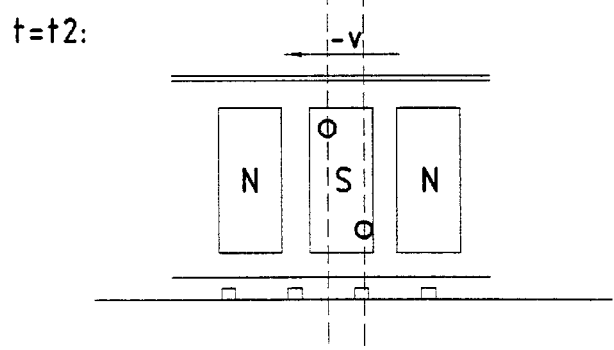
FIG. 3c is a third view for explaining the method according to the present invention.
Figure 3D:
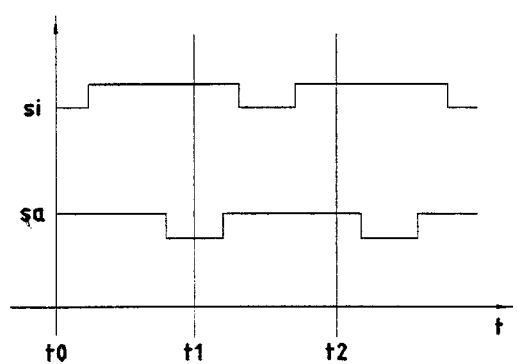
FIG. 3d is a characteristic curve for explaining the method according to the present invention.

As shown in FIG. 3*a*, the state of measured signals si and sa is ascertained at time t=t0, with the vehicle standing still. FIG. 3*b* indicates that measured signals si and sa change in response to passing over into state t=t1. In this case, a positive rotational direction is assumed for the slipping wheel. The wheels that rotate in the opposite direction pass over from state t=t0 into state t=t2, as is represented in FIG. 3*c*. Therefore, a negative rotational direction is detected in the represented case, when signals si and sa have a positive algebraic sign. As soon as a wheel (or a plurality of wheels) indicates a negative velocity or backwards roll, the braking pressure for at least one wheel is built-up or increased by drive/braking control system 108, in order to prevent the vehicle from rolling backwards. FIG. 3*d* gives a view of the characteristic curves of measured signals si and sa over time, and especially at times t0, t1, and t2.

As soon as the vehicle moves in a forward direction, the braking pressure is slowly reduced again. In particular, this is also the case with detecting an occurrence of starting from rest is detected, which is described below in detail.

When an occurrence of starting from rest with a slipping wheel is detected, the braking pressure at this wheel is quickly built-up until d1 has reached a value that can no longer be increased considerably. A maximum value dependent on load can also be defined in a family of characteristics stored in drive/braking control system 108. The braking pressure determines the maximum transmittable moment at the non-slipping wheel. As soon as an increase in d1 is detected at this wheel, this points to the start of an instability at the non-slipping wheel. This instability can be counteracted by reducing the drive torque. In addition, the braking intervention can act simultaneously in a supporting manner, by reducing the braking pressure at the slipping wheel and/or increasing the braking pressure at the non-slipping wheel.

If the braking pressure was already increased in a previously described manner to prevent rolling away or rolling backwards, this pressure can be decreased at the non-slipping wheel at a rate proportional to the increase in velocity, without changing d1 considerably. In this case, a rapid increase in velocity has the significance of a rapid decrease in pressure. The wheel then runs stably, as long as the wheel having low braking pressure does not lead to a decrease of d1 at the wheel having high braking pressure. Starting out from the braking pressure for preventing a backwards roll, the pressure at the wheel having low braking pressure can be increased so far in an emergency, that the maximum moment is transmitted at the wheel having high braking pressure. In modulating the pressure at the wheel having low braking pressure, a switch-over to smaller pressure-increase gradients can be effected, in which case d1 then remains approximately constant for increasing the control comfort, since a required basic blocking torque was already reached by the pressure for preventing backwards roll or roll-away.

In the present invention, the braking pressure is controlled in accordance with detecting roll-away and/or an occurrence of starting from rest. A tire sensor is especially advantageous in this case, since measured signals detected by it can already be evaluated at very low rotational speeds.

Instead of a tire sensor for detecting the backwards roll, another exemplary embodiment uses other sensors for measuring the wheel force, e.g. wheel-bearing sensors.

What is claimed is:

1. A method for controlling a handling of a vehicle in response to a movement, comprising the steps of:

causing tire sensors to detect forces acting on individual wheels;

supplying to an evaluation unit measured signals detected by the tire sensors;

detecting the measured signals while the vehicle is standing still;

detecting the measured signals in response to the movement of the vehicle;

analyzing each of the measured signals detected in response to the movement of the vehicle for a respective polarity thereof, in comparison with the measured signals detected while the vehicle is standing still, in the evaluation unit in order to detect a moving direction of individual tires of the vehicle while moving;

detecting, based on the analyzing, a slip of at least one of the tires during the movement of the vehicle; and causing a drive/braking control to correspondingly control a braking pressure at the at least one of the tires in order to prevent the slip.

2. The method according to claim 1, wherein:

the braking pressure control is implemented by the drive/braking control so that the vehicle is prevented from rolling backwards when starting from a stationary position.

3. The method according to claim 2, wherein:

in response to starting from rest, the drive/braking control implements a control, which changes from prevention of a backwards roll, into a drive control.

* * * * *